(12) United States Patent
Simonowits

(10) Patent No.: US 7,080,872 B1
(45) Date of Patent: Jul. 25, 2006

(54) WIPER REPLACEMENT

(76) Inventor: Menachem Simonowits, 34 Morris Rd., Spring Valley, NY (US) 10977

( * ) Notice: Subject to any disclaimer, the term of this patent is extended or adjusted under 35 U.S.C. 154(b) by 120 days.

(21) Appl. No.: 10/850,607

(22) Filed: May 20, 2004

Related U.S. Application Data

(60) Provisional application No. 60/472,203, filed on May 21, 2003.

(51) Int. Cl.
*A47L 1/02* (2006.01)

(52) U.S. Cl. ............. 296/96.15; 15/250.01; 15/250.001; 239/284.1; 239/284.2; 454/121

(58) Field of Classification Search ............ 296/96.15; 15/250.001, 250.01, 313; 239/284.1, 284.2; 454/121, 123
See application file for complete search history.

(56) References Cited

U.S. PATENT DOCUMENTS

| | | | |
|---|---|---|---|
| 1,789,016 A | | 1/1931 | Morgan |
| 2,701,897 A | * | 2/1955 | Leming .................. 239/284.1 |
| 2,716,339 A | | 8/1955 | Cline |
| 3,403,859 A | * | 10/1968 | Daansen .................. 239/284.1 |
| 5,097,563 A | * | 3/1992 | Cowan ........................ 15/313 |
| 5,140,719 A | * | 8/1992 | Cowan ........................ 15/313 |
| 5,419,005 A | * | 5/1995 | Mori ........................... 15/313 |
| 5,551,232 A | * | 9/1996 | Frigon et al. ................ 60/494 |
| 5,636,794 A | * | 6/1997 | Hess et al. ............... 239/284.1 |
| 5,820,026 A | * | 10/1998 | Raghu ..................... 239/284.1 |
| 5,965,950 A | * | 10/1999 | Park ......................... 307/10.1 |
| 6,249,931 B1 | * | 6/2001 | Sato ........................... 15/313 |
| 6,266,842 B1 | * | 7/2001 | Muller .................... 15/250.01 |

OTHER PUBLICATIONS

U.S. 3,695,979, withdrawn.

* cited by examiner

*Primary Examiner*—D. Glenn Dayoan
*Assistant Examiner*—Greg Blankenship

(57) ABSTRACT

A pneumatic windshield clearing system for enhancing the safety of operating a vehicle in difficult environmental circumstances without the distraction of wipers. The pneumatic windshield clearing system includes an air source assembly coupled vehicle, a blower assembly for directing high pressure airflow towards the windshield of the vehicle, and a suction assembly for removing rain, snow, and other debris for m the windshield.

11 Claims, 3 Drawing Sheets

WIPER REPLACEMENT

I. CROSS-REFERENCE TO RELATED APPLICATIONS

This application claims the benefit of U.S. Provisional Application No. 60/472,203, filed May 21, 2003.

II. BACKGROUND OF THE INVENTION

The present invention relates to windshield wiper systems and more particularly pertains to a new pneumatic windshield clearing system for clearing rain, snow, and blowing debris from a windshield without the use of wiper blades.

III. DESCRIPTION OF THE PRIOR ART

The use of windshield wiper and debris clearing systems is known in the prior art. Illustrative examples include: U.S. Pat. No. 1,789,016; U.S. Pat. No. 2,716,339; and U.S. Pat. No. 3,695,979.

More specifically, windshield wiper and debris clearing systems heretofore devised and utilized are known to consist basically of familiar, expected and obvious structural configurations, notwithstanding the myriad of designs encompassed by the crowded prior art which have been developed for the fulfillment of countless objectives and requirements.

In these respects, the pneumatic windshield clearing system according to the present invention substantially departs from the conventional concepts and designs of the prior art, and in so doing provides an apparatus primarily developed for the purpose of enhances the safety of operating automobiles in difficult environmental circumstances by keeping the windshield clear and eliminating the distraction caused by the pivotal action of wipers.

IV. SUMMARY OF THE INVENTION

In view of the foregoing disadvantages inherent in the known types of windshield wiper and debris clearing systems now present in the prior art, the present invention provides a new pneumatic windshield clearing system construction wherein the same can be utilized for enhances the safety of operating automobiles in difficult environmental circumstances by keeping the windshield clear and eliminating the distraction caused by the pivotal action of wipers.

To attain this, the present invention generally comprises an air source assembly operationally coupled to a blower assembly having at least one outlet for directing airflow onto a windshield of a vehicle.

There has thus been outlined, rather broadly, the more important features of a pneumatic windshield clearing system in order that the detailed description thereof that follows may be better understood, and in order that the present contribution to the art may be better appreciated. There are additional features of the pneumatic windshield clearing system that will be described hereinafter and which will form the subject matter of the claims appended hereto.

In this respect, before explaining at least one embodiment of the pneumatic windshield clearing system in detail, it is to be understood that the pneumatic windshield clearing system is not limited in its application to the details of construction and to the arrangements of the components set forth in the following description or illustrated in the drawings. The pneumatic windshield clearing system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present pneumatic windshield clearing system. It is important, therefore, that the claims be regarded as including such equivalent constructions insofar as they do not depart from the spirit and scope of the present invention.

It is another object of the present invention to provide a pneumatic windshield clearing system which has all of the advantages of the prior art and none of the disadvantages.

It is another object of the present invention to provide a pneumatic windshield clearing system which may be easily and efficiently manufactured and marketed.

It is another object of the present invention to provide a pneumatic windshield clearing system which is of durable and reliable construction.

It is yet another object of the present invention to provide a pneumatic windshield clearing system which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
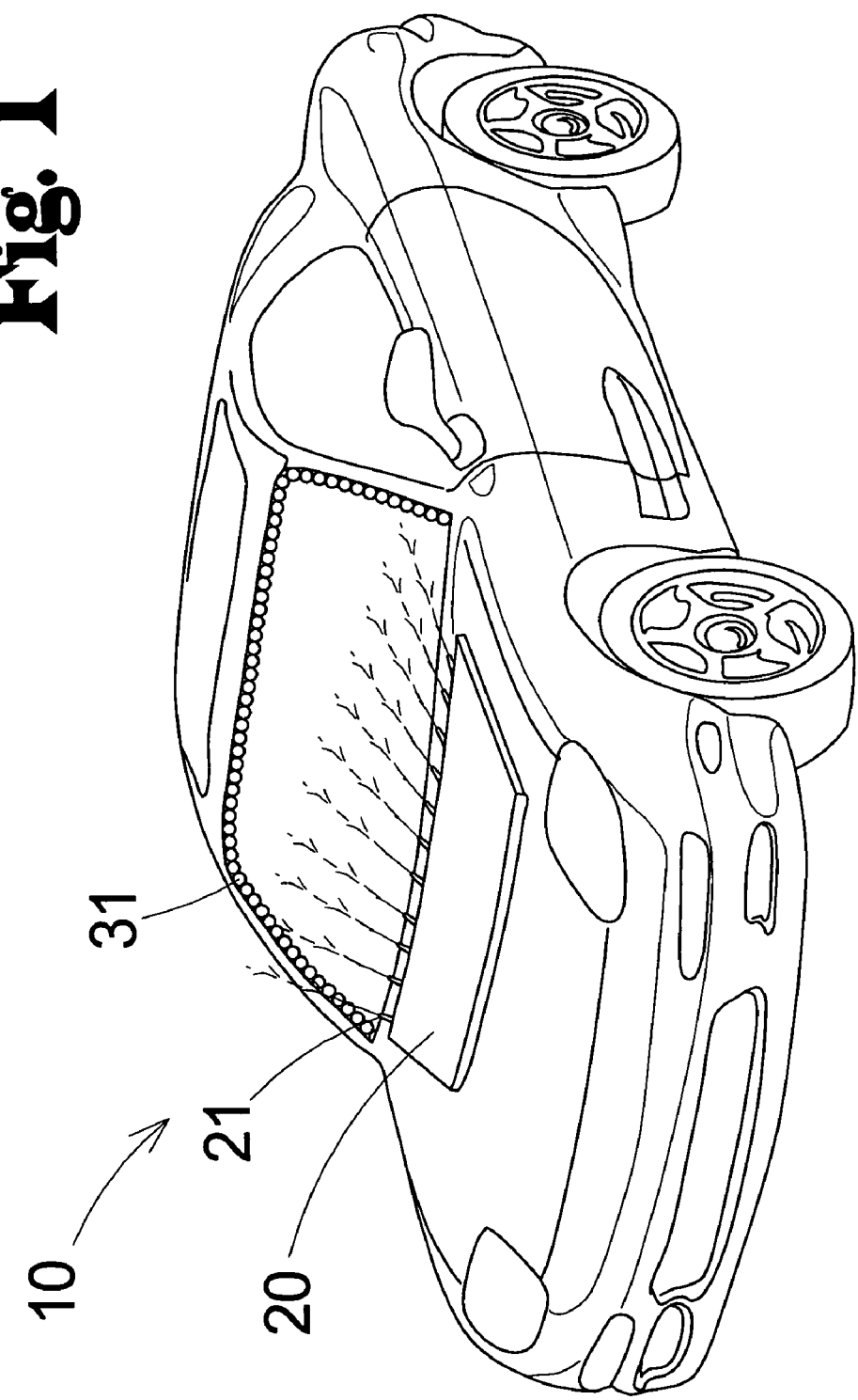
FIG. 1 is a schematic perspective view of a new pneumatic windshield clearing system according to the present invention.
Figure 2:
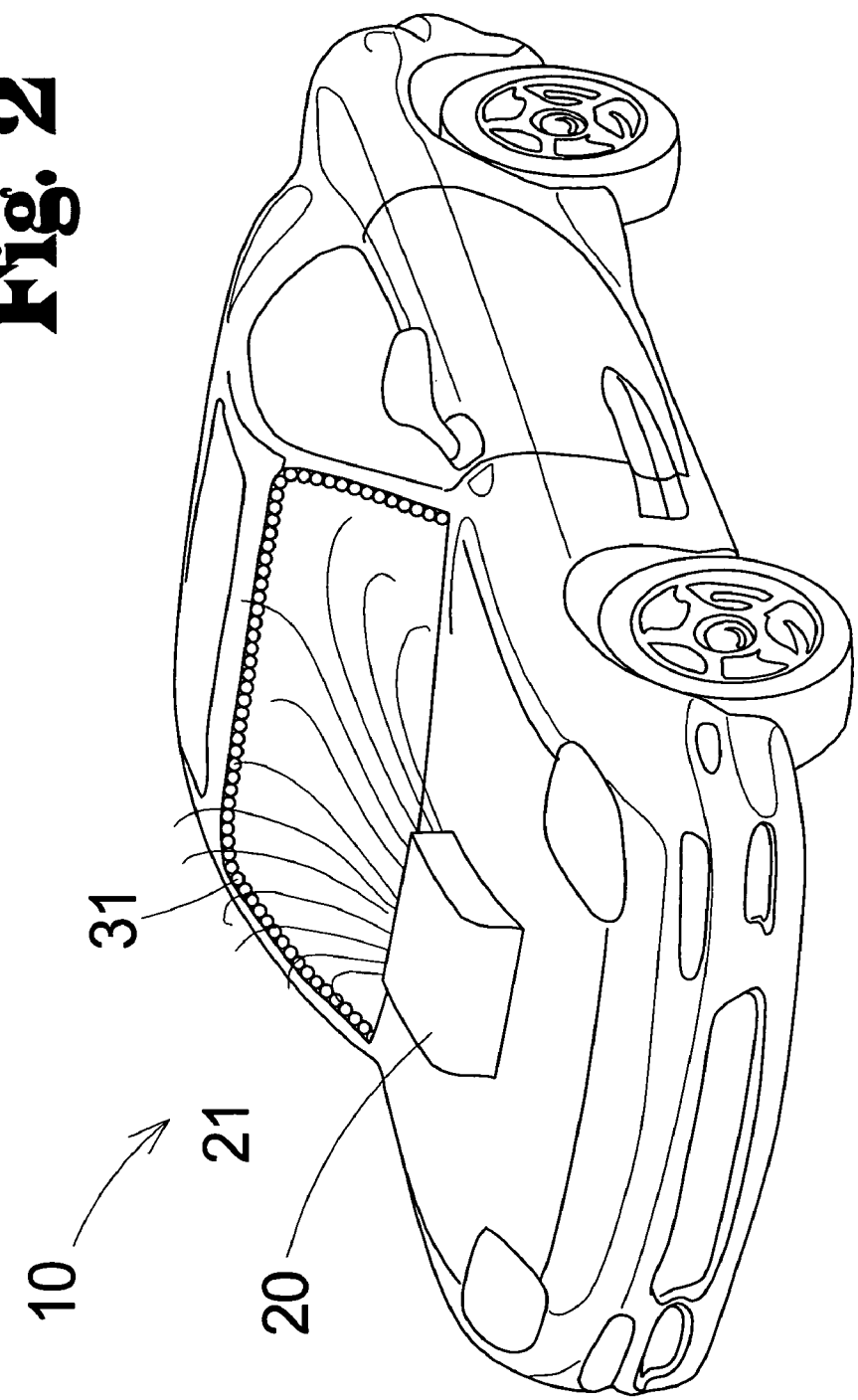
FIG. 2 is a schematic side view of the present invention.
Figure 3:
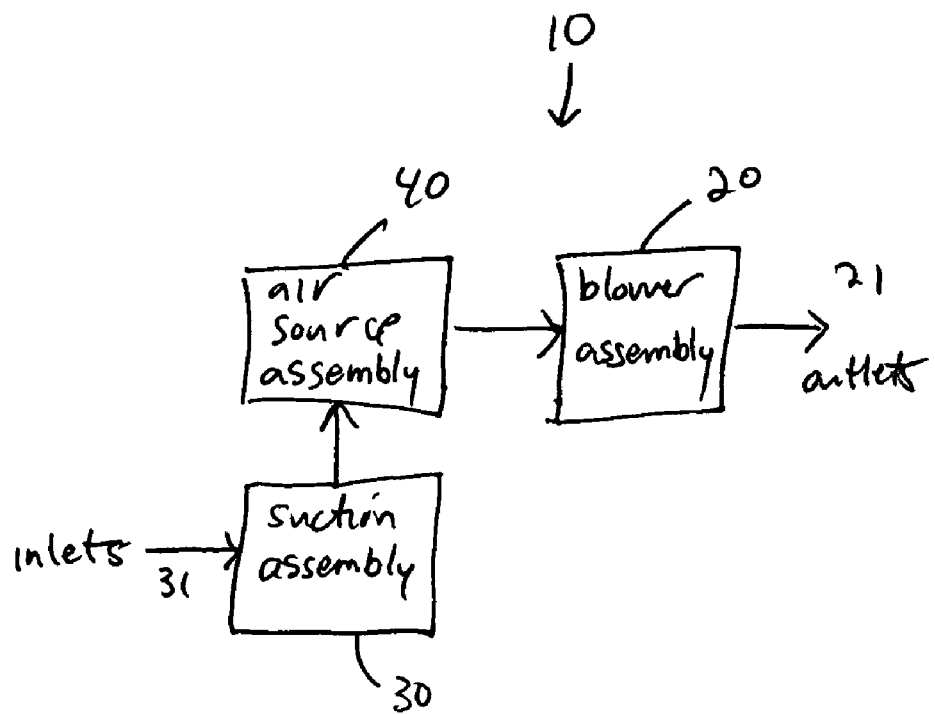
FIG. 3 is a schematic functional interconnect of the present invention.

With reference now to the drawings, and in particular to FIGS. 1 through 3 thereof, a new pneumatic windshield clearing system embodying the principles and concepts of the present invention and generally designated by the reference numeral 10 will be described.

As best illustrated in FIGS. 1 through 3, the pneumatic windshield clearing system 10 generally comprises a blower assembly 20, a suction assembly 30, and air source assembly 40.

The blower assembly 20 is preferably positioned on the hood of an automobile. The blower assembly 20 has at least one outlet 21 for directing high pressure airflow onto the windshield of the automobile for forcing rain, snow, and other debris off of the windshield. The blower assembly 20 is operationally coupled to the air source assembly 40.

The blower assembly 20 may include a shield portion 22 extending through the hood of the automobile. The shield portion 22 protects the outlet 21 and facilitates the direction of the air. The shield portion 22 may also facilitate directing airflow passing over the hood of the automobile.

Preferably, the blower assembly 20 includes a plurality of outlets 21 positioned along a bottom edge of the windshield to increase the area of coverage.

The suction assembly 30 is positioned on a perimeter of the windshield. The suction assembly 30 takes in air, rain, snow and other debris from the windshield through suction. The suction assembly 30 may be operationally coupled to the air source assembly 40.

Preferably, the suction assembly 30 includes a plurality of suction inlets 31 deployed along the perimeter edge of the windshield for maximizing the area of coverage.

The air source assembly 40 provides high pressure air to the blower assembly 20. The air source assembly 40 may be operationally coupled to the automobile.

In use, the system is activated whenever rain, snow, or other debris is blown of falls onto the windshield. The blower assembly forces the debris off of the windshield, while the suction assembly similarly pulls debris of the windshield. The combined action facilitates clearing the windshield without the need for wipers.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pneumatic windshield clearing system for use on an automobile, the system comprising:
    an air source assembly coupled to the automobile,
    a blower assembly operationally coupled to said air source assembly, said blower assembly having at least one outlet for directing high pressure airflow from said air source assembly towards a windshield of the automobile, and
    a suction assembly operationally coupled to said air source assembly,
    wherein said suction assembly further comprises at least one inlet positioned adjacent to said windshield for removing air, rain, snow, and other debris from the windshield.

2. The system of claim 1 wherein said blower assembly is positioned on a hood of the automobile to facilitate directing airflow towards the windshield.

3. The system of claim 1 wherein said blower assembly further comprises a shield portion, said shield portion protecting said at least one outlet.

4. The system of claim 3 wherein said shield portion at least partially directs airflow passing over a hood of the automobile towards the windshield of the automobile.

5. The system of claim 1 wherein said blower assembly further comprises a plurality of outlets, said plurality of outlets directing airflow from said air source assembly towards the windshield of the automobile.

6. The system of claim 5 wherein said plurality of outlets is positioned adjacent to a bottom edge of said windshield to increase an effective area of coverage by said blower assembly.

7. The system of claim 1 wherein said suction assembly further comprises a plurality of inlets, said plurality of inlets positioned along a perimeter edge of the windshield to maximize an effective area of coverage.

8. A pneumatic windshield clearing system for use on an automobile, the system comprising:
    an air source assembly coupled to the automobile, and
    a blower assembly operationally coupled to said air source assembly, said blower assembly having at least one outlet for directing high pressure airflow from said air source assembly towards a windshield of the automobile,
    wherein said blower assembly is positioned on a hood of the automobile to facilitate directing airflow towards the windshield,
    wherein said blower assembly further comprises a shield portion, said shield portion protecting said at least one outlet,
    wherein said suction assembly further comprises at least one inlet positioned adjacent to said windshield for removing air, rain, snow, and other debris from the windshield, and
    wherein said suction assembly further comprises a plurality of inlets, said plurality of inlets positioned along a perimeter edge of the windshield to maximize an effective area of coverage.

9. The system of claim 8 wherein the system further comprises a suction assembly operationally coupled to said air source assembly.

10. A pneumatic windshield clearing system for use on an automobile, the system comprising:
    an air source assembly coupled to the automobile,
    a blower assembly operationally coupled to said air source assembly,
    a suction assembly operationally coupled to said air source assembly,
    wherein said blower assembly further comprises a plurality of outlets, said plurality of outlets directing airflow from said air source assembly towards the windshield of the automobile,
    wherein said plurality of outlets being positioned adjacent to a bottom edge of said windshield to increase an effective area of coverage by said blower assembly, and
    wherein said suction assembly further comprises at least one inlet positioned adjacent to said windshield for removing air, rain, snow, and other debris from the windshield.

11. The system of claim 10 wherein said suction assembly further comprises a plurality of inlets, said plurality of inlets positioned along a perimeter edge of the windshield to maximize an effective area of coverage.

* * * * *